(12) United States Patent
Jenkinson et al.

(10) Patent No.: US 7,419,226 B2
(45) Date of Patent: Sep. 2, 2008

(54) WHEEL HUB ADAPTOR

(75) Inventors: Scott A. Jenkinson, Davisburg, MI (US); David G. Gonska, Beverly Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 121 days.

(21) Appl. No.: 11/407,262

(22) Filed: Apr. 19, 2006

(65) Prior Publication Data

US 2007/0246997 A1 Oct. 25, 2007

(51) Int. Cl.
*B60B 3/16* (2006.01)

(52) U.S. Cl. .............................. 301/35.629; 301/105.1; 301/108.1

(58) Field of Classification Search .............. 301/105.1, 301/35.621, 35.627, 35.628, 35.629, 35.631, 301/6.1, 6.8, 108.2, 108.4, 37.372, 108.1, 301/108.3, 108.5, 63.101, 137
See application file for complete search history.

(56) References Cited

U.S. PATENT DOCUMENTS

| | | | | |
|---|---|---|---|---|
| 2,854,287 A | * | 9/1958 | Stephens | 301/108.2 |
| 3,089,738 A | * | 5/1963 | Steiner | 384/473 |
| 3,834,766 A | * | 9/1974 | Thousand | 301/35.629 |
| 4,073,540 A | | 2/1978 | Jackowski | |
| 4,585,276 A | * | 4/1986 | Tirheimer | 301/36.1 |
| 4,606,582 A | * | 8/1986 | Warren | 301/37.372 |
| 4,847,030 A | | 7/1989 | Stalter | |
| 5,303,800 A | * | 4/1994 | Persson | 184/5.1 |
| 5,584,949 A | | 12/1996 | Ingram | |
| 5,860,708 A | | 1/1999 | Borders et al. | |
| 6,238,009 B1 | * | 5/2001 | Lovitt, Jr. | 301/35.629 |
| 6,273,519 B1 | | 8/2001 | Tsou | |
| 6,447,072 B1 | | 9/2002 | Johnson | |
| 6,488,342 B1 | | 12/2002 | DePaiva | |
| 6,543,858 B1 | * | 4/2003 | Melton | 301/137 |
| 6,983,999 B2 | * | 1/2006 | Goettker | 301/108.4 |

* cited by examiner

*Primary Examiner*—Russell D. Stormer
*Assistant Examiner*—Kip T Kotter
(74) *Attorney, Agent, or Firm*—Carlson, Gaskey & Olds

(57) ABSTRACT

A vehicle wheel assembly includes a hub adaptor that eliminates the need for a separate hub cap and gasket by providing wheel rim, wheel hub, and brake component attachment interfaces, as well as a lubrication chamber that can be visually inspected to monitor lubrication levels. The hub adaptor comprises a single piece body having an outwardly extending mounting flange with a first plurality of apertures that define a wheel rim attachment interface. The hub adaptor also includes an inner recessed area with a second plurality of apertures that define both the wheel hub and brake component attachment interfaces. The hub adaptor also includes an inner circumferential surface that provides a piloting and sealing interface between the hub adaptor and the wheel hub.

23 Claims, 2 Drawing Sheets

WHEEL HUB ADAPTOR

TECHNICAL FIELD

A vehicle wheel assembly utilizes a single piece hub adaptor that provides wheel rim, wheel hub, and brake component mounting interfaces, as well as providing a lubrication chamber that can be visually monitored.

BACKGROUND OF THE INVENTION

Conventional wheel assemblies include a separate hub cap that is mounted to an end of a wheel hub to provide a protective cover for wheel end components. The hub cap is mounted to the wheel hub with a plurality of mounting bolts. A gasket is also required to provide a sealed interface. With this conventional configuration, the hub cap and the wheel hub need to be removed in order to service a disc brake component, which is time consuming. Further, removal of these components also disturbs an inboard hub seal, which is undesirable.

Another disadvantage with this traditional configuration is that axle width is increased when the hub cap and associated gaskets are mounted to each wheel end on an axle assembly. For certain vehicle applications, the inclusion of the hub caps exceeds customer requirements.

Another disadvantage with using conventional hub caps is the resulting increase in weight, which adversely affects fuel economy. Further, the additional components required for assembly of the hub cap onto the wheel hub, such as the mounting bolts and gasket, add cost and increase assembly time, which is undesirable.

Thus, there is a need for a wheel component that can provide a sealed interface for lubrication, but which does not require a separate hub cap component. This wheel component should also allow a brake component to be serviced without removing the wheel hub or disturbing an inboard seal, as well as overcoming the other above-mentioned deficiencies in the prior art.

SUMMARY OF THE INVENTION

A vehicle wheel assembly includes a hub adaptor that provides multiple mounting interfaces for wheel components, as well as providing a lubrication chamber. The hub adaptor comprises a single piece body that includes attachment interfaces for a wheel rim, wheel hub, and a brake component, as well as including a lubrication chamber that holds lubricating fluid. In one disclosed example, the attachment interfaces include a first attachment interface for the wheel rim and a second attachment interface for the wheel hub and the brake component.

The lubrication chamber is preferably formed as a cup-shaped member and includes an outwardly facing end portion that supports a viewing window. The viewing window allows an operator to visually inspect and monitor lubrication levels within the lubrication chamber. A plug is mounted to the viewing window and can be selectively detached for adding lubricating fluid as needed, or for checking end play during service inspections.

In one example embodiment, the hub adaptor includes an outwardly extending mounting flange that includes a first plurality of apertures that define the first attachment interface. An inner recessed area includes a second plurality of apertures that define the second attachment interface. The inner recessed area is defined by a radially inward side wall that transitions from the outwardly facing end portion of the lubrication chamber to an inner base wall, and a radially outward side wall that transitions from the inner base wall to the outwardly extending mounting flange.

The subject invention provides a low-profile hub adaptor that allows the overall number of wheel components to be reduced, decreases overall wheel component weight, and decreases assembly time. Further, the subject invention provides these benefits without adversely affecting axle track requirements. These and other features of the present invention can be best understood from the following specification and drawings, the following of which is a brief description.

DETAILED DESCRIPTION OF THE PREFERRED EMBODIMENT

Figure 1:
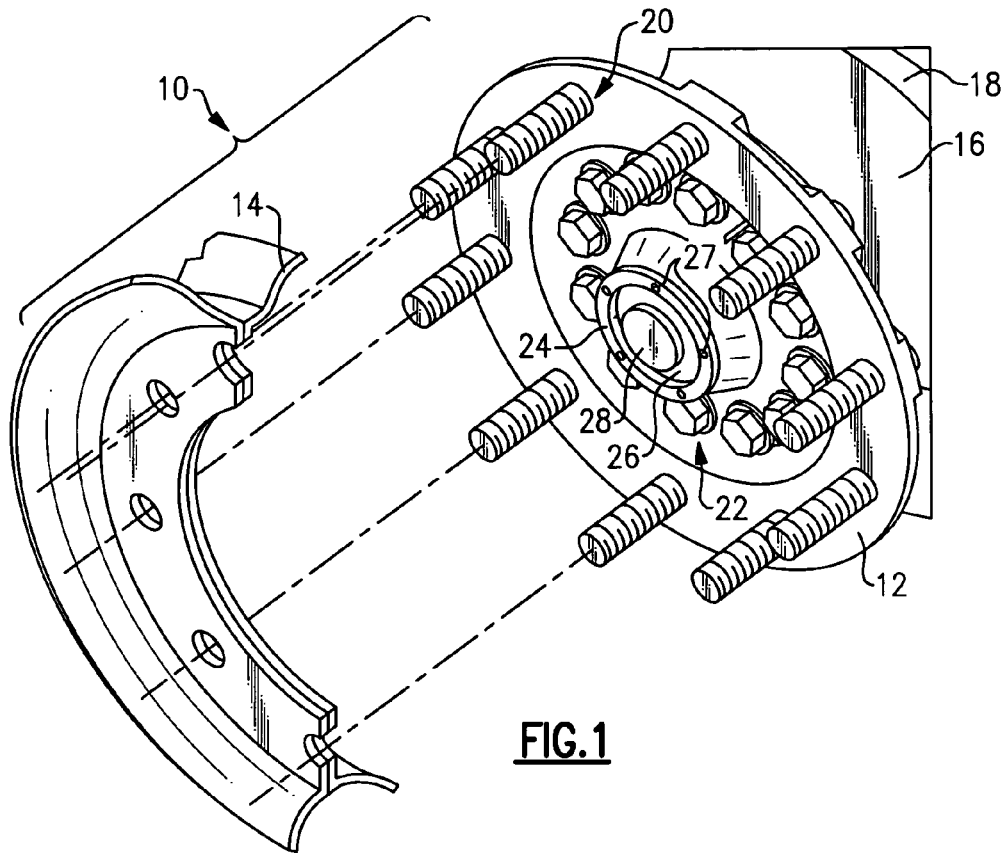
FIG. 1 is a partial exploded view of a wheel end assembly incorporating the subject invention.

A vehicle wheel end assembly 10 for an axle (not shown) provides a hub adaptor 12 that includes mounting interfaces for a wheel rim 14, brake component 16, and wheel hub 18. In FIG. 1, the wheel rim 14 is not connected to the hub adaptor 12 for clarity purposes. One vehicle wheel end assembly 10 is mounted at each end of the axle. Further, the subject wheel end assembly 10 can be used on any type of axle including drive, non-drive, steer, trailer, etc.

In the example shown, the hub adaptor 12 includes a first attachment interface 20 for the wheel rim 14 and a second attachment interface 22 for both the brake component 16 and wheel hub 18, as generally indicated in FIG. 1. In the example shown in FIGS. 1 and 2, the brake component 16 comprises a brake rotor, however, a brake drum could also be used.

The hub adaptor 12 also includes a lubrication chamber 24 that holds lubrication fluid. A viewing window 26 is mounted to an outwardly facing end of the lubrication chamber 24 with fasteners 27. The viewing window 26 is preferably made from a clear or transparent material, such as plastic for example, which allows for visual monitoring and inspection of lubrication levels; however, non-transparent materials may also be used depending on the application. A plug 28 is mounted within the viewing window 26. The plug 28 can be selectively detached to allow lubrication fluid to be added into the lubrication chamber 24 as needed when lubrication levels fall below a minimum desired level. Optionally, the viewing window 26 could be eliminated, with only the plug 28 being used. Further, in certain applications, the plug 28 can be configured to allow pressure relief as needed to address pressure changes during operation.

Figure 2:
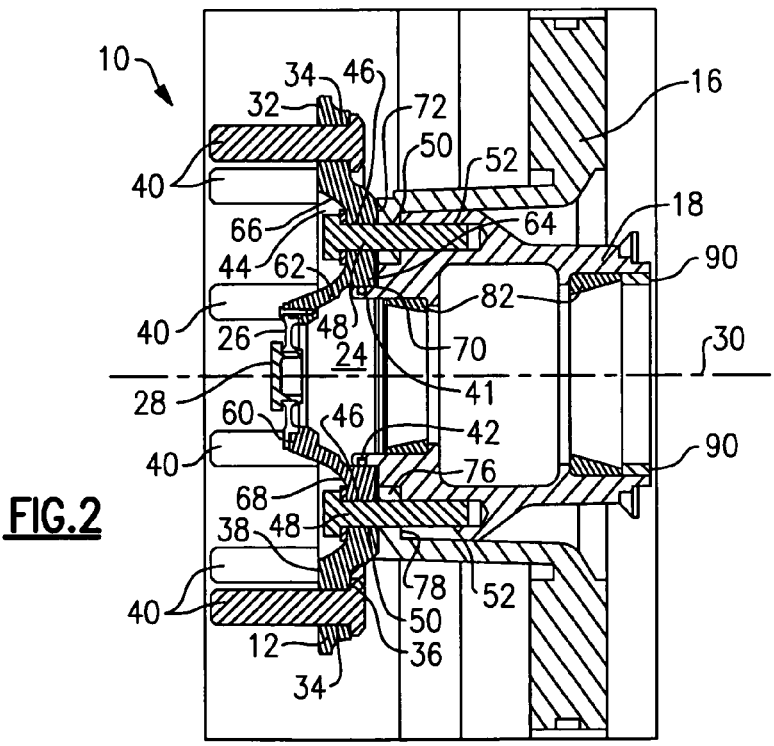
FIG. 2 is a cross-sectional view of the wheel end assembly incorporating the subject invention.

The hub adaptor 12 is shown in greater detail in FIG. 2. As discussed above, the hub adaptor 12 is mounted for rotation with the wheel hub 18, which rotates about an axis 30. The hub adaptor 12 is comprised of a single piece body that includes an outwardly extending mounting flange 32 with a first plurality of apertures 34 that define the first attachment interface 20. The outwardly extending mounting flange 32 includes an inboard facing surface 36 and an outboard facing surface 38. The term "inboard" refers to a direction that faces inwardly toward a vehicle center, and the term "outboard" refers to a direction that faces outwardly away from a vehicle center. Thus, the inboard facing surface 36 of the outwardly extending mounting flange 32 faces the brake component 16, which is mounted inboard of the hub adaptor 12.

A first plurality of fasteners 40 is inserted through the first plurality of apertures 34 to attach the wheel rim 14 (FIG. 1) to the hub adaptor 12. In this example, when connected to the wheel rim 14, the first plurality of fasteners 40 forms a bolt circle that is positioned at a greater radial distance from the axis 30 than the second attachment interface 22. However, the bolt circle could also be positioned at the same or a closer radial distance to the axis 30 depending on the application.

The hub adaptor 12 includes a recessed area 44 that includes a second plurality of apertures 46 that define the second attachment interface 22. In this example, a second plurality of fasteners 48 is inserted through the second plurality of apertures 46 to secure both the brake component 16 and the wheel hub 18 to the hub adaptor 12. For a drum brake application, either plurality of holes could be used to secure the brake component 16. In the example shown, the brake component 16 comprises a brake rotor that includes brake apertures 50 and the wheel hub 18 includes hub apertures 52 that are aligned with the second plurality of apertures 46. Thus, the second plurality of fasteners 48 can be used to secure all three components together. This forms a second bolt circle that is positioned at a radial distance that is closer to the axis 30 than the first attachment interface 20; however this second bolt circle could also be positioned at other radial locations like those described above.

A sealing interface is provided between the wheel hub 18 and the hub adapter 12. The wheel hub 18 includes an extension portion 41 that extends into the lubrication chamber 24. An o-ring seal 42 is positioned directly between the extension portion 41 and an inner circumferential surface of the hub adapter 12. The extension portion 41 extends in an outboard direction and provides an efficient way to both seal and pilot the wheel hub adapter.

The lubrication chamber 24 comprises a cup-shaped portion that includes an outboard base wall 60 and a side wall 62 that cooperate to form an inner cavity that holds the lubrication fluid. The outboard base wall 60 is positioned in a plane that is outboard of the outboard facing surface 38 of the outwardly extending mounting flange 32.

The recessed area 44 is defined by the side wall 62, which transitions into an inboard base wall 64, which transitions into outer side wall 66, which transitions into the outwardly extending mounting flange 32. The inboard base wall 64 includes an outboard facing surface 68 and an inboard facing surface 70. The outboard facing surface 68 is a visual surface that can be seen from outside the vehicle.

In the example mounting configuration shown, the inboard facing surface 70 abuts directly against the brake component 16 at a first contact surface 72. While abutment is shown between the inboard facing surface 70 and the brake component 16, these components would optionally be spaced from the inboard facing surface 70.

Further, the outboard facing surface 68 of the inboard base wall 64 is positioned in a plane that is inboard of a plane defined by the outboard facing surface 38 of the outwardly extending mounting flange 32. This allows the second attachment interface 22 to be positioned inboard of the first attachment interface 20 to provide a low-profile, compact design.

The brake component 16 includes a radially inwardly extending mounting flange 76 that is sandwiched between an outer peripheral end face 78 of the wheel hub 18 and the inboard base wall 64 of the hub adaptor 12. The wheel hub 18 is supported for rotation on a spindle (not shown) with bearings 82 as known.

Figure 3:
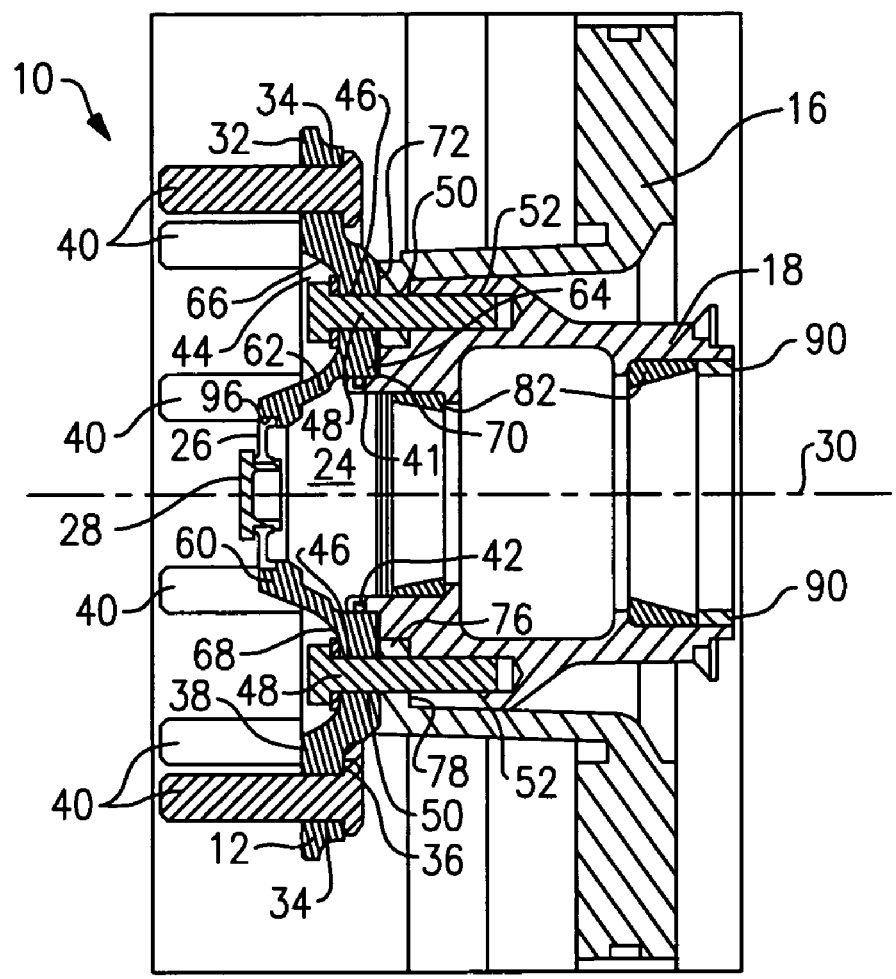
FIG. 3 is a cross-sectional view similar to that of FIG. 2 but showing a different attachment interface for a sight glass.
Figure 4A:
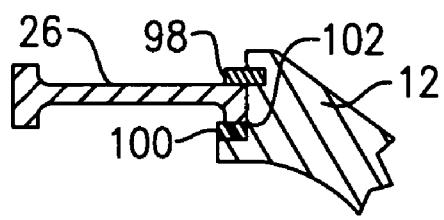
FIG. 4A shows a section of another example of an attachment interface for the sight glass.
Figure 4B:
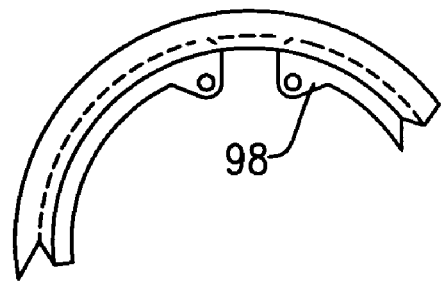
FIG. 4B is a top view of the example of FIG. 4A.

FIGS. 3 and 4A-4B show optional attachment interfaces for the viewing window 26. In the example of FIG. 3, the viewing window 26 is threadably attached to the hub adapter 12 at a threaded attachment interface 96. A sealing compound, such as RVT or Loctite® for example, could be used at the threaded attachment interface 96 to provide a good sealing effect. This example configuration eliminates the need for seals, screws, and support plate structures.

In the example of FIGS. 4A-4B, the viewing window 26 is attached to the hub adapter 12 with a circlip/spring clip 98 and seal 100. The hub adapter 12 includes a groove 102 that receives the circlip 98 and seal 100. An edge of the viewing window is sandwiched between the circlip 98 and seal 100 within the groove 102.

As shown in FIGS. 2 and 3, a seal 90 is positioned within the wheel hub 18 inboard of the bearings 82. The seal 90 engages the spindle as known. One advantage with using the subject hub adapter 12 is that the brake component 16 can be serviced without removing the wheel hub 18 or disturbing the seal 90.

Further, the subject invention provides an apparatus for retaining lubricating fluid in a wheel end without using a conventional hub cap design. The lubricating fluid can be easily drained and filled through the use of the plug 28, without having to disassemble any wheel components. The viewing window 26 allows lubrication levels to be monitored, as well as providing an inspection area for inspecting end play between the wheel hub 18 and spindle without having to disassemble the vehicle wheel. Further, by eliminating the hub cap, assembly times and weight are reduced, which provides additional cost savings.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel hub adaptor for a vehicle wheel comprising:
    a single piece body having at least one attachment interface that comprises at least one of a wheel rim attachment interface, a wheel hub attachment interface, and a brake component attachment interface, and said single piece body including a lubrication chamber for receiving lubrication fluid; and
    wherein said at least one attachment interface comprises a first attachment interface that is the wheel rim attachment interface and a second attachment interface that is the wheel hub and the brake component attachment interfaces.

2. The wheel hub adaptor according to claim 1 wherein said single piece body includes an outwardly extending mounting flange with a first plurality of apertures that cooperate to define said first attachment interface, and said single piece body includes a recessed portion with a second plurality of apertures that define said second attachment interface.

3. The wheel hub adaptor according to claim 2 wherein said recessed portion is defined by a base wall, a radially inward side wall, and a radially outward side wall transitioning from said base wall to said outwardly extending mounting flange.

4. The wheel hub adaptor according to claim 3 wherein said lubrication chamber comprises a cup-shaped portion having an outwardly facing base end that transitions into said radially inward side wall, said outwardly facing base end supporting a viewing window.

5. The wheel hub adaptor according to claim 1 including a viewing window supported on an outward end face of said lubrication chamber, said viewing window allowing visual inspection of lubrication levels.

6. The wheel hub adaptor according to claim 5 including a plug mounted within said viewing window, said plug being selectively detachable to allow access to said lubrication chamber.

7. The wheel hub adaptor according to claim 5 wherein said viewing window is threadably attached to said hub adapter.

8. The wheel hub adapter according to claim 1 including a seal positioned between the wheel hub adapter and a pilot member extending outwardly from an end of a wheel hub such that sealing and piloting are achieved at a common location.

9. The wheel hub adaptor according to claim 1 wherein an innermost inboard surface of said single piece body comprises a wheel hub end face contact surface.

10. A vehicle wheel assembly comprising:
a wheel hub defining an axis of rotation;
a brake component mounted for rotation with said wheel hub; and
a hub adaptor including a single piece body having a first attachment interface for connection to a wheel rim, a second attachment interface for connection to both said wheel hub and said brake component, and a lubrication chamber that receives lubricating fluid.

11. The vehicle wheel assembly according to claim 10 wherein said single piece body includes an outwardly extending mounting flange with a first plurality of apertures that define said first attachment interface and an inner recessed area including a second plurality of apertures that define said second attachment interface.

12. The vehicle wheel assembly according to claim 10 wherein said wheel hub includes a pilot member extending outwardly from an end of the wheel hub, said pilot member supporting a seal that engages said hub adapter.

13. The vehicle wheel assembly according to claim 10 wherein said single piece body includes an outboard base wall, a radially inward side wall that transitions from said outboard base wall to an inboard base wall, and a radially outward side wall that transitions from said inboard base wall to an outwardly extending mounting flange, and wherein said outboard base wall and said radially inward side wall cooperate to form said lubrication chamber, and wherein said inboard base wall and said radially inward and radially outward side walls cooperate to define an inner recessed area.

14. The vehicle wheel assembly according to claim 13 including a viewing window mounted to said outboard base wall, said viewing window allowing visual inspection of lubrication levels within said lubrication chamber.

15. The vehicle wheel assembly according to claim 13 wherein said inboard base wall includes an inboard surface facing said wheel hub and said brake component, and an outboard surface facing opposite of said inboard surface, said outboard surface being visible from outside a vehicle.

16. The vehicle wheel assembly according to claim 10 wherein an innermost inboard surface of said single piece body abuts directly against an outboard end face of said wheel hub.

17. A method of assembling a vehicle wheel comprising the steps of:
providing a hub adaptor comprising a single piece component rotatable about an axis and having a lubrication chamber and at least one attachment interface for mounting a wheel rim, a brake component, and a wheel hub;
mounting the wheel rim to the hub adaptor;
mounting the wheel hub to the hub adaptor; and
mounting the brake component to the hub adaptor; and
mounting a viewing window to an end face of the lubrication chamber to allow visual inspection of lubrication levels within the lubrication chamber.

18. The method according to claim 17 including providing the at least one attachment interface as a first attachment interface located at a first radial distance from the axis and a second attachment interface located at a second radial distance from the axis different from the first radial distance, mounting the wheel rim to the hub adaptor at the first attachment interface, and mounting the wheel hub and the brake component to the hub adaptor at the second attachment interface.

19. The method according to claim 18 including servicing the brake component without having to remove the wheel hub from an axle assembly.

20. The method according to claim 18 including piloting and sealing the hub adapter and the wheel hub at a pilot portion extending outwardly from the wheel hub.

21. The method according to claim 17 including attaching a plug to the viewing window to seal lubricating fluid within the lubrication chamber.

22. The method according to claim 21 including selectively detaching the plug from the viewing window, and adding lubricating fluid to the lubrication chamber when lubrication levels fall below a minimum level.

23. The method according to claim 17 including abutting an outboard end face of the wheel hub directly against an inboard surface of the single piece component.

* * * * *

UNITED STATES PATENT AND TRADEMARK OFFICE
CERTIFICATE OF CORRECTION

PATENT NO. : 7,419,226 B2
APPLICATION NO. : 11/407262
DATED : September 2, 2008
INVENTOR(S) : Jenkinson et al.

It is certified that error appears in the above-identified patent and that said Letters Patent is hereby corrected as shown below:

Claim 1, Column 4, line 45: "lubrication" should read as --lubricating--

Signed and Sealed this

Fourth Day of November, 2008

JON W. DUDAS
*Director of the United States Patent and Trademark Office*